United States Patent Office 3,444,221
Patented May 13, 1969

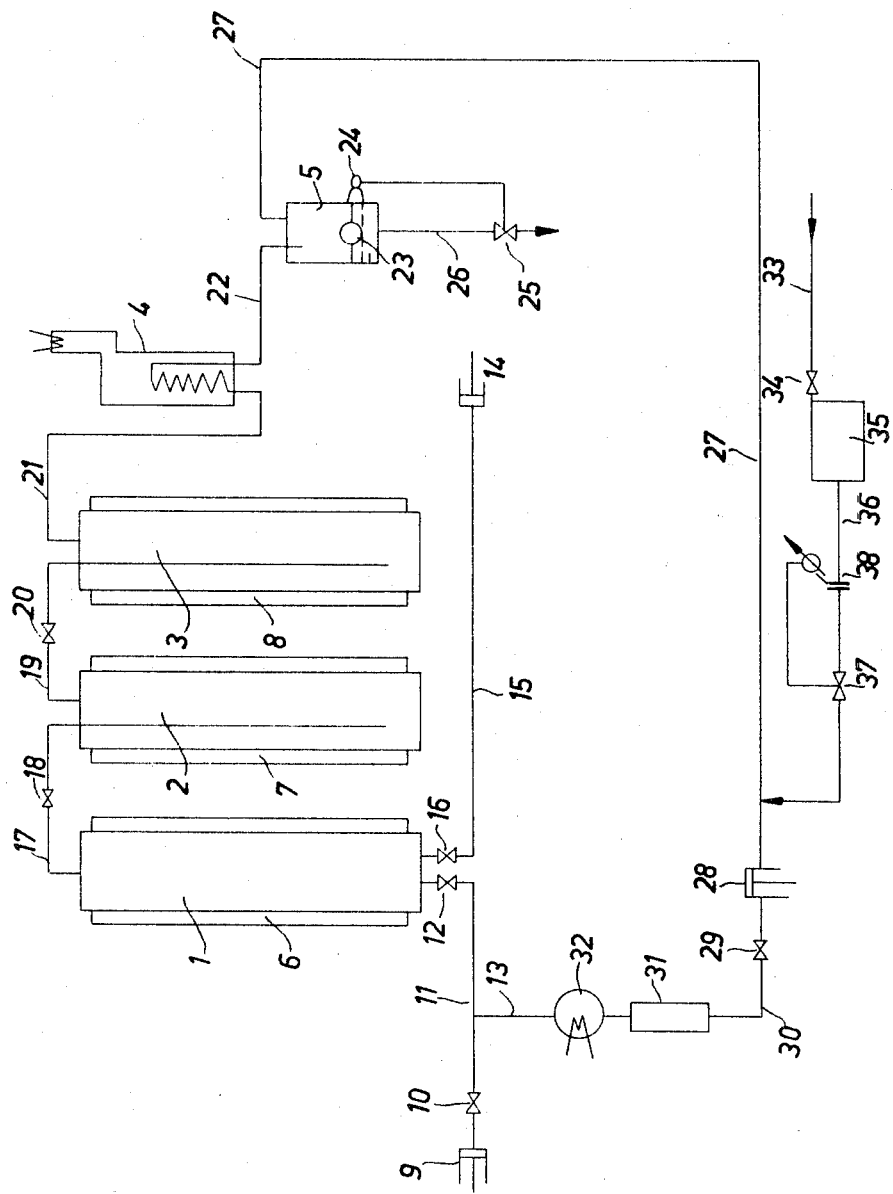

3,444,221
PROCESS FOR THE CONTINUOUS HARDENING OF UNSATURATED OILS AND FATS
Theodor Voeste and Hans-Joachim Schmidt, Frankfurt am Main, Germany, assignors to Metallgesellschaft Aktiengesellschaft, Frankfurt am Main, Germany, a corporation of Germany
Filed Nov. 30, 1966, Ser. No. 598,003
Claims priority, application Germany, Dec. 3, 1965, M 67,524
Int. Cl. C11c 3/12
U.S. Cl. 260—409                    10 Claims

ABSTRACT OF THE DISCLOSURE

The disclosure covers the continuous hardening of hydrogenatable oil or fat material (e.g., soy bean oil) by contact in liquid phase with hydrogen gas in the presence of a hydrogenation catalyst (e.g., 0.005–0.5% suspended nickel particles based on the hydrogenatable material) at excess pressure (e.g., 2–10 atm.) and preferably elevated temperature (e.g., 150–200° C.) in a confined zone completely filled with the reactants, in a volumetric ratio of the portion of the zone filled with the liquid phase to the portion thereof filled with hydrogen gas of at least 10:1 (preferably 50–10:1). Unused hydrogen is preferably recycled with fresh hydrogen (e.g., in a volumetric ratio of unused recirculating hydrogen to fresh hydrogen of 2–10:1).

---

The present invention relates to a process for the continuous hardening of oils and fats.

The commercial demand for solid fats, such as edible fats for example, is much greater than the demand for liquid fats. The fats that occur in nature, however, are mostly liquid at room temperature. Consequently, liquid fats and oils are generally used to produce solid fats.

Fats and oils are mixtures of esters of various fatty acids with glycerin as the alcholic component. Where the fat has a low melting point, this is attributable to the high content of unsaturated fatty acids in the particular glycerides. However, it is possible by catalytic treatment with hydrogen, under pressure and preferably at elevated temperature, to increase the degree of saturation of a fat and hence to raise its melting point. This reaction is known as hardening.

In performing the hydrogenation, it is considered desirable to conduct the reaction in such a manner that only a partial hydrogenation takes place, that is, the saturation of the double bonds in the polyunsaturated fatty acid groups of the glycerides takes place stepwise. This selective hardening is intended to produce glycerides of mixed acidity which have the lowest possible content of tri-unsaturated fatty acids, and which have a certain particular iodine number and a certain particular melting point.

The hardening is still usually performed by a periodic type of procedure, i.e., batch method, because this permits easy control of the rate of transformation and permits the reaction to be halted when the desired degree of transformation has been reached. In German printed specification 1,109,818, a process for the continuous hardening of unsaturated oils and fats is described, but in which the material to be hardened is actually conducted step-wise through an autoclave, and in each step temporarily withdrawn from the longitudinal flow and circulated in a cross current in a closed circuit. The apparatus required for the performance of such reaction is, however, relatively complicated, owing to the way in which the reaction is conducted. Also, the pressure of the hydrogen in the apparatus must be kept under constant supervision.

In German printed specification 1,082,689 there is described a process for the hydrogenation of unsaturated oils and fats which can be performed continuously. In this process the material to be hydrogenated is circulated through a vessel and a recirculating line connected therto, by means of a circulating pump. The hydrogen gas is introduced at a point on the discharge side of the circulating pump in a quantity of no more than 0.5% of the weight of the material being hydrogenated, and is mixed with the latter, whereupon the hydrogenation reaction takes place. However, in order to obtain a uniform product, it is necessary, according to this published specification, to perform the reaction in a plurality of steps or stages.

As in all previously known hardening processes, a precise control of the hydrogen pressure is necessary in the last-mentioned process, as well, in order to achieve a selectively hardened fat of the required melting point under the other stated reaction conditions, which include, for example, the composition of the starting material and the activity of the catalyst. Nevertheless, in the continuous processes known hitherto, it has not always been possible to maintain the required melting point when the conditions of the reaction vary, as for example when the continuously fed starting material varies in composition or when the catalyst after prolonged use declines in activity.

It is an object of the present invention to overcome the foregoing drawbacks and to provide a versatile process for the continuous selective hardening of hydrogenatable material such as unsaturated oils and/or fats.

It is another object of the present invention to provide a process of the foregoing type utilizing gaseous hydrogen in contact with liquid phase unsaturated oil and/or fat in a flow path through which unused hydrogen gas is recirculated with fresh makeup hydrogen.

It is still another object of the present invention to provide a process of the foregoing type in such a manner that only partial hydrogenation takes place to saturate certain double bonds in the polyunsaturated fatty acid moieties of glycerides to produce hydrogenated glycerides of mixed acidity and preferably which have the lowest possible content of tri-unsaturated fatty acid moieties.

It is still another object of the present invention to provide a process of the foregoing type in which the iodine number and melting point of the hardened fat and/or oil product is kept constant to achieve a consistent product without the need for concomitantly constant control of the hydrogen pressure and/or of the composition of the starting material and/or of the activity of the catalyst.

It is a still further object of the present invention to provide a process of the foregoing type in which versatile adjustment is possible either in terms of the amount of hydrogen freshly introduced at constant feed rate of hydrogenatable material or in terms of the amount of hydrogenatable material introduced at constant feed rate of the fresh hydrogen so that a desired constant degree of hardness may be attained in the final product.

It is still another object of the present invention to provide a process of the foregoing type in which the volumetric ratio between the liquid phase of the hydrogenatable oil and/or fat and the gaseous phase of the hydrogen within the entire hydrogenation apparatus amounts to at least 10:1 and wherein preferably the amount of recirculated unused hydrogen is such that the volumetric ratio thereof to the freshly added makeup hydrogen is between about 2–10:1.

It is still another object of the present invention to provide a process of the foregoing type in which conventional temperatures and pressures and catalysts may be utilized and in which the desired iodine number and melting point of the end product are maintained constant, under the specified volumetric ratio of liquid phase to gaseous phase despite variations in the hydrogen pressure and/or in the activity of the catalyst and/or in the composition of the starting fat or oil.

Other and further objects will become apparent from the study of the within specification and accompanying drawing, in which:

The figure shown illustrates schematically a flow system including three series connected reactors and a hydrogen recirculation system connected therewith for attaining continuous hydrogenating in accordance with one embodiment of the present invention.

It has now been found, in accordance with the present invention, that unsaturated oils and fats may be continuously and selectively hardened, in such a manner that, even in the case of a change in catalyst activity and in the composition of the starting material, the required melting point of the hardened fat can be maintained precisely within a few tenths of a degree. Furthermore, a precise control of the hydrogen pressure is no longer necessary when carrying out the process of the present invention.

Briefly, the instant invention relates to a method for the continuous selective hardening of unsaturated oils and fats at conventional elevated pressure, e.g., 2-10 atm., and preferably at conventional elevated temperature, e.g., 150-200° C., in which the material to be hydrogenated is treated in the liquid state with circulated hydrogen, making use of a hydrogenating catalyst such as any conventional hydrogenation catalyst including finely divides nickel or cobalt, Raney nickel or Raney cobalt. Platinum or palladium catalysts may also be used. The catalyst may be supported by charcoal, kieselguhr, silica gel or other carries and may be activated or deactivated by the addition of other substances. The process of the invention is significantly characterized in that the volumetric ratio of the portion of the hydrogenation apparatus that is filled with liquid to the portion of the entire apparatus that is filled with hydrogen amounts to at least 10:1, and preferably about 10-50:1.

More specifically, in carrying out the process of the invention, in accordance with one preferred embodiment, the oil, or the starting fat in liquid form, is fed together with the catalyst through a succession of reaction chambers in tandem, as a rule, at elevated temperature. The hydrogen required for the hydrogenation is preheated if desired, and is then also pumped into the first reaction chamber and bubbles successively through all the other reaction chambers. The unconsumed hydrogen is withdrawn from the final reaction chamber together with the hardened fat and the catalyst suspended therein, and is then separated from the hardened fat in a separator. While the hardened fat is continuously taken from the separator and filtered to remove the catalyst therefrom, the hydrogen separated from the hardened fat is purified, if desired, and circulated back into the first reaction chamber. Fresh hydrogen is proportioned into the hydrogen circuit at a suitable point, preferably automatically. The amount of the hydrogen freshly injected into the circuit determines, the degree of hardness of the finished fat.

In accordance with the process of the instant invention, the volumetric ratio between the liquid and the gaseous phase within the entire hydrogenation apparatus including separators, pumps, piping, heat exchangers etc., amounts to at least 10:1, and preferably about 50-10:1 as aforesaid. Significantly, if this condition specified in accordance with the present invention is observed, the hydrogen pressure necessary for the performance of the reaction establishes itself automatically, and the regulation of the pressure as the reaction continues is no longer necessary, since the pressure variations occurring in the present process surprisingly have such an influence on the course of the partial selective hydrogenation that, even in the case of fluctuating conditions, such as changing catalyst activity, or in the case of non-uniform starting material which is difficult to harden, the prescribed melting point of the finished fat varies no more than ±0.5° C. in the most unfavorable cases, and less than ±0.3° C. in most cases. Also, the iodine number of the hardened product is constant to within ±0.4 unit.

The greater the aforesaid ratio between the liquid and gaseous phase the better is the constancy of the melting point and the constancy of the iodine number of the hardened oil or fat. That means that the constancy of the melting point and the iodine number is greater with a ratio of 50:1 between the liquid and the gaseous phase than with the ratio of 10:1 between the liquid and the gaseous phase.

Of course, versatile adjustment is possible either in terms of the amount of hydrogen freshly introduced at constant feed rate of hydrogenatable material or in terms of the amount of hydrogenatable material introduced at constant feed rate of the fresh hydrogen so that a desired constant degree of hardness may be attained in the finished product.

The dimensions of the reaction chambers used in carrying out the instant process are not critical within the sizes customary in the art, so that practically any of the autoclaves or reaction columns commonly used in the art can serve as reaction chambers for the process of the invention. However, to achieve the greatest possible uniformity in residence time of the individual oil or fat molecules in the overall reaction space, preferably at least 2 reaction chambers are arranged in tandem. In many cases, it has proven advantageous to arrange as many as 20 reaction chambers in tandem. It is also possible to divide a large reaction chamber by vertical or horizontal partitions so as to create a plurality of rection chambers one following the other. Is is, of course, also possible, though not essential, to install baffling, such as plates, screens or the like, in the individual reaction chambers for the purpose of agitating the reaction mixture flowing therethrough.

The hydrogen can be mixed in with the material to be hydrogenated at the entrance of each reaction chamber, and the unconsumed hydrogen can be separated from the fatty phase at the end of each reaction chamber and be carried away separately, so that only the oil or liquid fat and the catalyst flow successively through the reaction chambers arranged in tandem. In this case, the individual reaction chambers are in a parallel arrangement as far as the hydrogen flow is concerned.

It is also possible to pass the starting material and the hydrogen in a counterflow through the reaction chambers. In this case, the hydrogen generally flows from the bottom up through a multistage reactor, while the material being hardened flows in the opposite direction through the individual reaction chambers.

Regardless of whether the hydrogen and the fatty phase with the catalyst suspended in it pass in the same directions through the successive reaction chambers or whether the hydrogen bubbles through the reaction chambers in parallel flow, the unconsumed hydrogen is circulated back into the reaction process after the separation of the fatty phase. Of course, it is preferable for the fresh hydrogen being supplied to the reaction system to be proportioned automatically into the circulating hydrogen.

It has proven advisable to set the rate of circulation of the hydrogen so high that the volumetric proportion of freshly injected and, if desired, preheated hydrogen to the circulated hydrogen amounts to no more that 1:2, and preferably to between 1:4 and 1:10, preferably about 1:2-10.

The individual reaction chambers are adjusted to the required elevated temperature for the reaction by heating or cooling. Small reaction chambers e.g. in pilot plants, must generally be heated, big reactor chambers such as in production plants, must be cooled owing to the liberated heat of reaction. It is also possible to adjust the temperature of the reaction mixture in the individual reaction chambers to different, usually successively increasing temperatures, i.e., 160, 180 and 190° C. in the case of three tandem arranged flow chambers.

In most cases, the catalyst is fed only to the first reaction chamber in paste or suspended form. If desired, however, more catalyst can be added in the succeeding reaction chambers, as for example when this is necessary for the saturation of special double bonds, i.e., where hardening special types of unsaturation in the starting fat or oil. The catalyst is generally present in an amount of between about 0.005–0.05% by weight of the hydrogenatable material, preferably about 0.01% by weight thereof and may be introduced as a 10% suspension in such hydrogenatable or fatty material.

The present invention will now be further explained with reference to the annexed drawing, which is a flow diagram of a pilot plant installation having three reaction chambers for carrying out the instant process, and which is given only by way of illustration and not limitation.

The installation includes the three pressure reactors 1, 2 and 3, the condenser or cooler 4 and the separator 5. The pressure reactors 1, 2 and 3 are equipped with corresponding heating or cooling jackets 6, 7 and 8, through which flows a liquid heat exchange medium (not shown), or steam. In this manner it is possible to adjust the desired reaction temperature in each reactor. The material to be hydrogenated i.e., oil or liquefied fat, is continuously fed by pump 9 through valve 10, line 11 and valve 12 into the reactor 1, which, like reactors 2 and 3, is completely filled with the liquid, disperse reaction mixture. Thus, there is no gas cushion at the top of reaction chambers 1, 2 and 3.

In the example represented, the hydrogen is incorporated through pipe 13 into the starting material flowing through pipe 11, so that the material being hydrogenated and the hydrogen pass together through valve 12 into the reaction chamber. It is also possible, however, to introduce the hydrogenatable material and the hydrogen gas into the reaction chamber through separate lines.

The catalyst may be mixed in the required amount with the oil or liquefied fat that is used as starting material and then pumped together with the latter into reaction chamber 1 by means of pump 9. Often, however, it is more advantageous if the catalyst is made separately into a paste with a small amount of the material being hydrogenated and is pumped, for instance, in the form of a 10% pulp therein, through line 15 and valve 16 into reaction chamber 1 by means of pump 14.

The liquid fatty phase, which also contains the catalyst, flows upward through reactor 1 at the rate at which fresh starting material is fed in by pump 9. In order to achieve the greatest possible equalization of the time during which all fat molecules remain in the reaction chamber, baffling means (not shown) can be installed in the reactors, such as, for example, two vertically spaced horizontal plates equipped with central orifices for each reactor.

The hydrogen bubbles through the material in reactor 1, and at the upper end of reactor 1 it is carried, together with the overflowing fatty phase, through line 17 and valve 18 into the bottom part of reactor 2. From the latter reactor, the reaction mixture in the same way is taken at the upper end by line 19 and, after passing through valve 20, is fed into the bottom part of reactor 3. After passing through this last reaction chamber, the hardened fat together with the catalyst suspended in it and the attendant unused hydrogen flows through line 21 into the cooler 4 where the reaction mixture is cooled. The cooled mixture is then fed through pipe 22 into the phase separator 5 in which the still liquid fat and the catalyst separate from the hydrogen gas. The gas chamber of separator 5, i.e., above the liquid level therein, is kept as small as possible. The liquid fat collecting in the bottom part of separator 5 acts through the float 23 and the switch controlling means 24 of conventional design, operatively coupled therewith and in turn with valve 25, to control the discharge of the fat and of the catalyst suspended in it out of separator 5 through line 26.

In a further apparatus, which is not shown in the drawing, e.g., a filter press of conventional design, the catalyst may be separated from the fat discharged through line 26 and fed back into the process via line 11 or 15 as the case may be, at which point a portion of used-up catalyst can be replaced by fresh catalyst, if desired.

The hydrogen is aspirated from separator 5 through recirculation line 27 by the hydrogen circulation pump 28, and carried through valve 29 and line 30 into the oil separator 31 for removal of attendant traces of oil or fat materials. After passing through the latter, the hydrogen is warmed in heater 32 and fed through line 13 for mixing with the starting material in line 11 to complete the recycling of such gas in the system.

The hydrogen consumed in the reaction is replaced, of course, by the introduction of a corresponding amount of fresh hydrogen, preferably into the recirculation line 27. For this purpose it is possible, as shown in the drawing, to use hydrogen which may be fed under pressure from a supply tank or generator or other source through line 33, expanding it through a valve 34 into the buffer tank 35 in which a pressure of, for example, 25 atm. is maintained. The hydrogen gas is taken from the buffer tank 35 through line 36 which contains the regulating valve 37 and the volume measuring apparatus 38 of conventional design operatively coupled with such valve 37. The measuring apparatus 38 meters out the required amount of hydrogen at constant pressure by means of the automatic operation of the regulating valve 37 thereby. The hydrogen flowing through the regulating valve 37 is thus incorporated into the hydrogen being fed back through the recirculation line 27.

In the case where, for example, hydrogen has to be taken continuously from a hydrogen source at an approximately constant rate into the hydrogen recirculation line 27, it is recommendable to adjust the desired degree of hardness of the fat or oil by merely varying the rate of feed of the starting fat into the reaction chamber 1, as aforesaid.

Therefore, at the temperatures and pressures used in practice, i.e., 150–200° C. and 2–10 atmospheres, for example, changes in the activity of the catalyst and variations in the composition of the starting material will have practically no influence in the prescribed melting point of the selectively hardened fat if, according to the present invention, the condition is fulfilled that the ratio of the volume of the liquid phase in the whole apparatus to the volume of gaseous phase is at least 10 to 1. The volume of the gaseous and the liquid phase in the apparatus is to be considered, for determining such ratio, in the case of the example represented in the drawing, that gas or liquid volume contained in the reactors 1, 2 and 3, the cooler 4, the separators 5 and 31, the pump 28, the heater 32, and the corresponding interconnecting lines or pipes, and in the recirculation line 27.

The valves 10, 12, 16, 18, 20 and 29 serve to close off flow lines when the apparatus is shut down.

The following examples are set forth for the purpose of illustration and not limitation. Specifically, Example 1 demonstrates the significant insensitivity of the process of the present invention to pressure variations, while Examples 2 and 3 show that a change in catalyst activity and in the temperature in the reaction chambers has no effect on the hardening results.

Example 1

In an experimental apparatus similar to the one represented in the drawing, having three reaction chambers constituted by individual autoclaves and a total capacity of 105 liters, 27 kg. of soybean oil having an iodine number of 130 were pumped hourly by pump 9 into the autoclave 1. In the same period of time, 270 g. of catalyst suspension were fed through line 15 by pump 14 into the same autoclave. The catalyst suspension was composed of 1 part by weight of fresh nickel catalyst, 9 parts by weight of nickel catalyst that had been used several times, and 90 parts by weight of soybean oil. The fresh catalyst was a promoted nickel catalyst type RCH50/5 supported by kieselguhr, commercially available from Ruhrchemie in Gelsenkirchen, West Germany. 95 to 98% of the fresh catalyst had particle size below 32. At the same time, 1.350 liters of fresh hydrogen per hour were metered into the recirculation line 27 through the regulating valve 37. Approximately 102 liters of liquid phase and about 5 liters of hydrogen were present simultaneously in the entire apparatus (including the hydrogen in the recirculation line). The volumetric ratio between the liquid and the gaseous phase in the whole apparatus thus amounted to about 20:1. The hydrogen present in the apparatus was recirculated approximately 1000 times per hour. Thus the volumetric ratio between the recycled unused hydrogen and the fresh hydrogen was 3.7:1. The temperature was maintained at 160° C. in reactor 1, 180° C. in reactor 2 and 190° C. in reactor 3.

During the reaction, pressure variations occured in the reactors and the rest of the apparatus which were between 2 and 4 atmospheres excess pressure.

The hardened soybean oil was withdrawn continuously from separator 5 and filtered for the removal of the catalyst suspended therein.

Over an experimental period of 10 hours, the iodine number of the final product varied only between 80.0 and 80.5, while the melting point remained constant at 35.0° C.

Example 2

The reaction under the conditions stated in Example 1 was repeated, but this time a catalyst suspension was used which contained 10 parts by weight of used nickel catalyst in 90 parts of soybean oil, i.e., without any fresh replacement catalyst.

The pressure in the reactors rose within 3 hours from 2.5 to 6.0 atmospheres excess pressure and varied for the next 20 hours between 6.0 and 7.5 atmospheres.

The iodine number and the melting point of the end product did not vary any more than in the case of Example 1.

Example 3

The reaction was then again continued under the conditions stated in Example 1, that means with a catalyst suspension composed of 1 part by weight of fresh catalyst and 9 parts by weight of used catalyst, but the temperatures were changed so that the reactor 1 had a temperature of 200° C., reactor 2 of 190° C. and reactor 3 of 180° C. The pressure diminished from 6–7.5 atmospheres excess pressure and varied between 2 and 4 atmospheres excess pressure during the next 3 hours. For the following 10 hours the pressure varied between 3 and 4 atmospheres excess pressure. The melting point and the iodine number of the hardened soybean oil did not vary any more than in the cases of Examples 1 and 2.

From the foregoing, it will be clear that starting hydrogenatable fats and/or oils may be used which have different degrees of unsaturation yet which, in accordance with the process conditions to be observed herein, will produce a hardened product of constant iodine number and melting point. Besides soybean oil, other triunsaturated fatty acid glycerides may be utilized, including those glycerides containing, i.e., acrylic and/or acetylenic unsaturation such as oleic and stearolic fatty acid groups among the triglyceride moieties. Among the vegetable and animal oils which may be hardened according to the present invention are for example (with the iodine number given in parentheses): soybean oil (128–135), linseed oil (170–204), peanut oil (84–100), rapeseed oil (97–108), safflower oil (140–150), sunflower oil (125–136), herring oil (124–128), sardine oil (170–193), whale oil (110–135), menhaden oil (148–160). In any case, the various starting fats and oils are conventional. The change in iodine number and melting point which may be achieved to obtain a hardened product is determined by the amount of the hydrogen freshly injected into the circuit. By the present invention it is possible to attain a high degree of stability of the melting point and the iodine number of the hardened oil or fat, even in the case of fluctuating conditions, by the exact ratio of the liquid phase hydrogenatable material to the gaseous hydrogen phase present in the overall system including recirculating hydrogen and any fresh hydrogen being added, so long as the overall ratio of 10–50:1 is observed. Actual changes in such ratio are conveniently attained by changing the feed rate of the fat and/or oil to be hydrogenated at constant feed rate of the hydrogen gas or by changing the feed rate of the hydrogen gas at constant feed rate of the starting fat and/or oil. Advantageously, the amount of hydrogen being recirculated as unused hydrogen should be sufficient that the amount of freshly introduced hydrogen observes the aforementioned ratio of unusued to fresh hydrogen of 2–10:1, with both unused and fresh hydrogen being considered in determining the main ratio of liquid phase to gaseous phase of 10–50:1.

Therefore, the present invention provides a process for the continuous selective hardening of unsaturated oils and fats which comprises hydrogenating continuously hydrogenatable material selected from the group consisting of unsaturated oil and unsaturated fat in liquid phase with hydrogen gas in a hydrogenation zone in the presence of a hydrogenation catalyst, while maintaining in said hydrogenation zone a volumetric ratio of the liquid phase to the hydrogen gas of at least 10:1, and recovering continuously the reaction mixture thereby formed.

Preferably, the hydrogenation zone includes two or more series flow connected sub-paths through which said liquid phase and gas pass successively, said sub-paths being maintained at different elevated temperatures.

Also, in such embodiment the hydrogen gas is passed preferably cocurrently with the liquid phase through the sub-paths. The unused hydrogen gas is preferably recovered from the last sub-path in the flow direction in question and continuously recycled with fresh hydrogen gas back to the first corresponding sub-path, with the volumetric ratio of such recycled unused gas to the fresh gas preferably being 2:1 and more especially 2–10:1. In particular, the hydrogenation catalyst may be passed through the sub-paths suspended in the liquid phase and the liquid phase may constitute, for example, soybean oil having an iodine number of about 128–135.

In accordance with a particular embodiment of the invention, a process is provided for the continuous selective hardening of unsaturated oils and fats which comprises passing continuously hydrogenatable material selected from the group consisting of unsaturated oil and unsaturated fat in liquid phase and hydrogen gas through a hydrogenation zone flow path in contact with each other at elevated temperature and elevated pressure in the presence of a hydrogenation catalyst to hydrogenate continuously said material, while maintaining in said path a volumetric ratio of the liquid phase to the hydrogen gas within the range of about 10–50:1, said liquid phase and hydrogen gas occupying substantially completely said path, recovering continuously the resulting reaction mixture from said path, and separating unused hydrogen gas from the recovered reaction mixture including the hydrogenated material formed.

More especially, said liquid phase and hydrogen gas are passed continuously in cocurrent flow through said path from an inlet at one end thereof to an outlet at the other end thereof, said catalyst is passed continuously through said path in suspended form in said liquid phase and is recovered with the hydrogenated material in said reaction mixture, said unused gas is separated from the reaction mixture at said outlet and recycled continuously with fresh hydrogen gas back to said inlet for introduction into said path in a volumetric ratio of unused gas to fresh gas within the range of about 2–10:1, and said ratio of liquid phase to hydrogen gas of 10–20:1 is based upon both the hydrogen gas in said path and the unused and fresh hydrogen gas being introduced thereinto.

Also, the catalyst may be used in an amount between about 0.005–0.05% by weight based on the hydrogenatable material, and the hydrogenated material and the catalyst in the reaction mixture are thereafter separated from each other. In accordance with a specific feature, the flow path includes three series flow connected sub-paths maintained at correspondingly elevated temperatures and maintained at elevated pressures of between about 2 to 10 atmospheres. The starting material may also be a mixture of such unsaturated oil and fat.

It will be appreciated that the instant specification, examples and drawing are set forth for the purpose of illustration and not limitation, and that changes and modifications will occur to the artisan which may be made without departing from the spirit and scope of the present invention.

What is claimed is:

1. Process for the continuous selective hardening of unsaturated oils and fats which comprises hydrogenating continuously hydrogenatable material selected from the group consisting of unsaturated oil, unsaturated fat, and mixtures thereof, in liquid phase with hydrogen gas in a hydrogenation zone in the presence of a hydrogenation catalyst for such hydrogenatable material, while maintaining in said hydrogenation zone a volumetric ratio of the liquid phase to the hydrogen gas within the range of about 10–50:1, recovering continuously the reaction mixture thereby formed, separating unused hydrogen gas therefrom, and recycling continuously such unused hydrogen gas together with fresh hydrogen gas back to the hydrogenation zone in a volumetric ratio of such recycled unused gas to said fresh gas within the range of about 2–10:1.

2. Process according to claim 1 wherein said hydrogenation zone includes at least two series flow connected sub-paths through which said liquid phase and gas pass successively, said sub-paths being maintained at different elevated temperatures.

3. Process according to claim 2 wherein said hydrogen gas is passed cocurrently with said liquid phase through said sub-paths.

4. Process according to claim 3 wherein unused hydrogen gas is recovered from the last sub-path in said flow direction and recycled continuously with said fresh hydrogen gas back to the first corresponding sub-path.

5. Process according to claim 4 wherein said hydrogenation catalyst is passed through said sub-paths suspended in said liquid phase.

6. Process according to claim 5 wherein said liquid phase constitutes substantially soybean oil having an iodine number of about 128–135.

7. Process for the continuous selective hardening of unsaturated oils and fats which comprises passing continuously hydrogenatable material selected from the group consisting of unsaturated vegetable and animal oil, unsaturated vegetable and animal fat, and mixtures thereof, in liquid phase and hydrogen gas through a hydrogenation zone flow path in contact with each other at elevated temperature and elevated pressure in the presence of a hydrogenation catalyst for such hydrogenatable material to hydrogenate continuously said material, while maintaining in said path a volumetric ratio of the liquid phase to the hydrogen gas within the range of about 10–50:1, said liquid phase and hydrogen gas occupying substantially completely said path, recovering continuously the resulting reaction mixture from said path, separating unused hydrogen gas from the recovered reaction mixture including the hydrogenated material formed, and recycling continuously such unused hydrogen gas together with fresh hydrogen gas back to the hydrogenation zone flow path in a volumetric ratio of such recycled gas to said fresh gas within the range of about 2–10:1, the hardening selectivity being directly dependent upon the volumetric ratio of said liquid phase to the hydrogen gas in said hydrogenation zone flow path.

8. Process according to claim 7 wherein said liquid phase and hydrogen gas are passed continuously in cocurrent flow through said path from an inlet at one end thereof to an outlet at the other end thereof, said catalyst is passed continuously through said path in suspended form in said liquid phase and is recovered with the hydrogenated material in said reaction mixture, said unused gas is separated from the reaction mixture at said outlet and recycled continuously with fresh hydrogen gas back to said inlet for introduction into said path in said volumetric ratio of unused gas to fresh gas within the range of about 2–10:1, and said ratio of liquid phase to hydrogen gas of 10–50:1 is based upon both the hydrogen gas in said path and the unused and fresh hydrogen gas being introduced thereinto.

9. Process according to claim 8 wherein said catalyst is used in an amount between about 0.005–0.05% by weight based on said hydrogenatable material, and the hydrogenated material and said catalyst in the reaction mixture are separated from each other.

10. Process according to claim 9 wherein said liquid phase constitutes substantially soybean oil having an iodine number of about 128–130 and said flow path includes at least two series flow connected sub-paths maintained at different elevated temperatures of between about 150–200° C. and at elevated presures of between about 2–10 atmospheres.

References Cited

UNITED STATES PATENTS

| | | | |
|---|---|---|---|
| 2,520,423 | 8/1950 | Mills et al. | 260—409 |
| 2,520,425 | 8/1950 | Mills | 260—409 |

FOREIGN PATENTS

| | | |
|---|---|---|
| 1,082,689 | 6/1960 | Germany. |

ALEX MAZEL, *Primary Examiner.*

R. J. GALLAGHER, *Assistant Examiner.*

U.S. Cl. X.R.

99—118, 122

UNITED STATES PATENT OFFICE
CERTIFICATE OF CORRECTION

Patent No. 3,444,221                                           May 13, 1969

Theodor Voeste et al.

It is certified that error appears in the above identified patent and that said Letters Patent are hereby corrected as shown below:

Column 1, line 19, "(e.g., 0.005-0.5%" should read -- (e.g., 0.005-0.05% --. Column 4, line 52, after "same" insert -- direction or in opposite --.

Signed and sealed this 14th day of April 1970.

(SEAL)
Attest:

Edward M. Fletcher, Jr.                         WILLIAM E. SCHUYLER, JR.
Attesting Officer                                         Commissioner of Patents